Oct. 7, 1969  L. V. NISLEY  3,470,901
METHOD AND MEANS FOR CONNECTING FLUID TUBING TO FLUID DEVICES
Filed Sept. 22, 1967  4 Sheets-Sheet 3
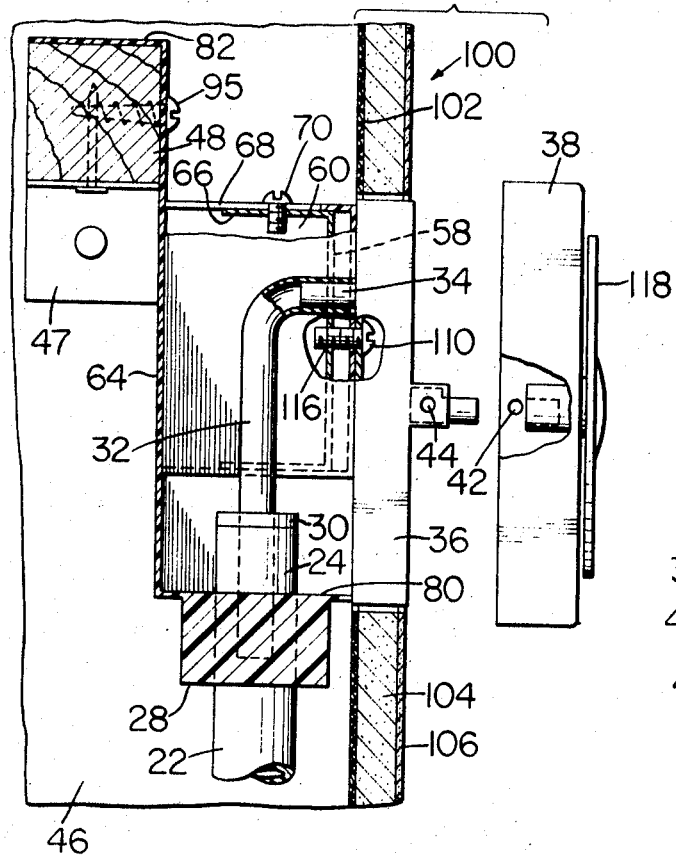
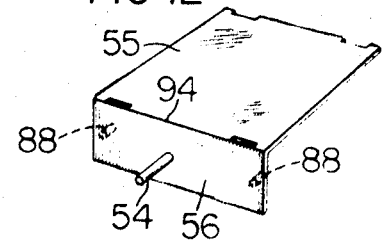
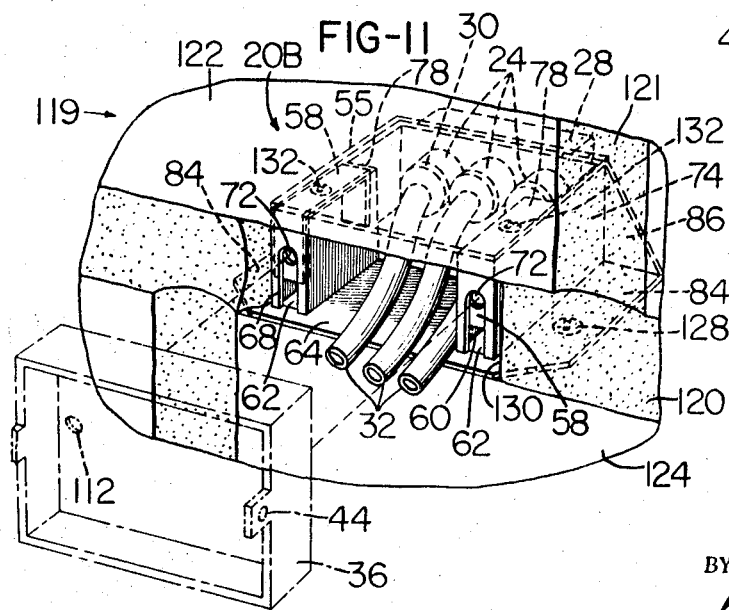
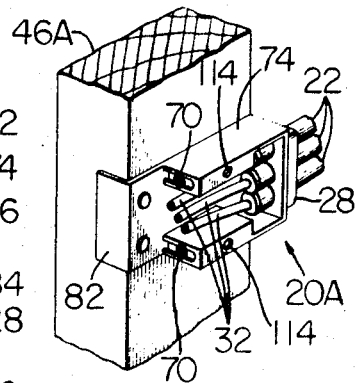
INVENTOR.
LARRY V. NISLEY
BY
HIS ATTORNEYS

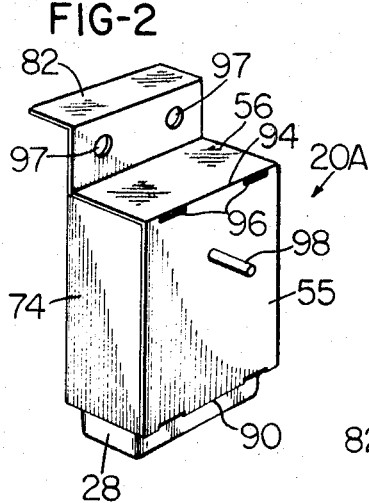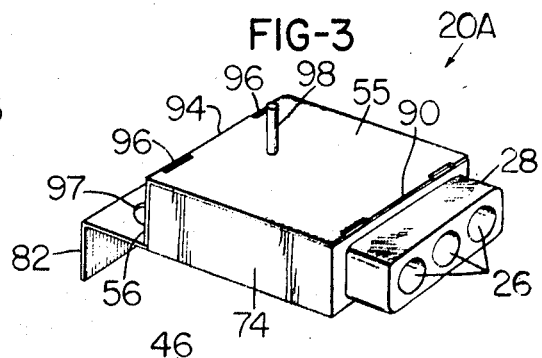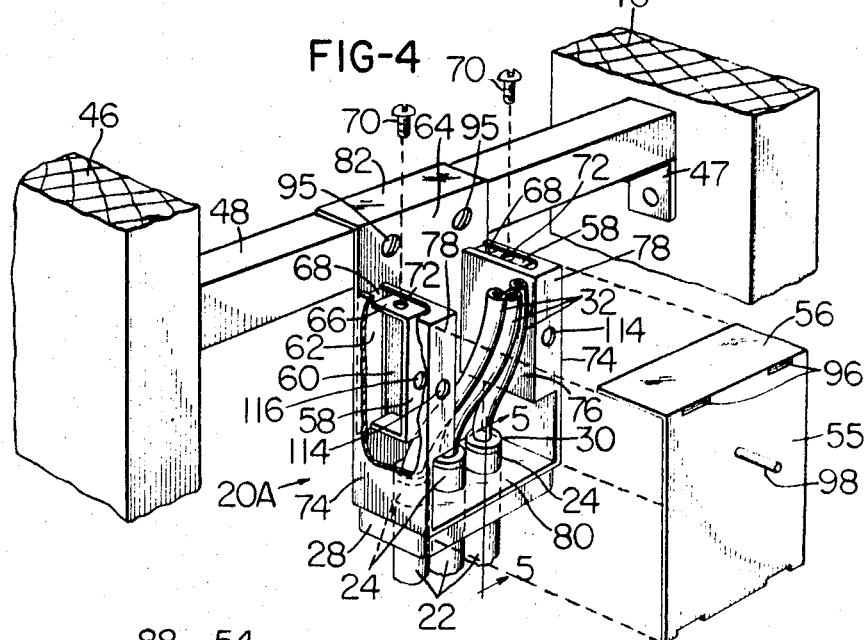

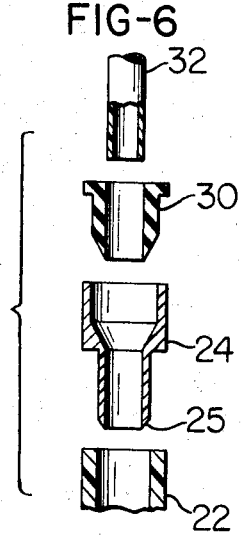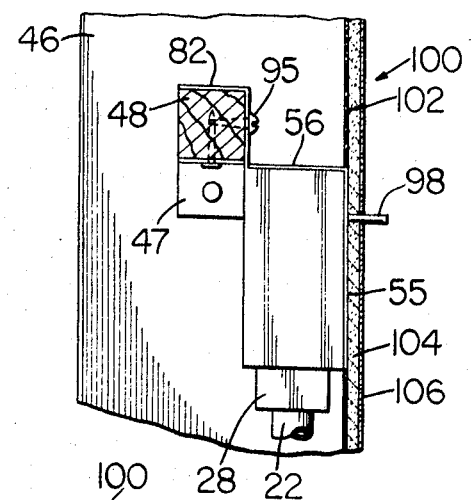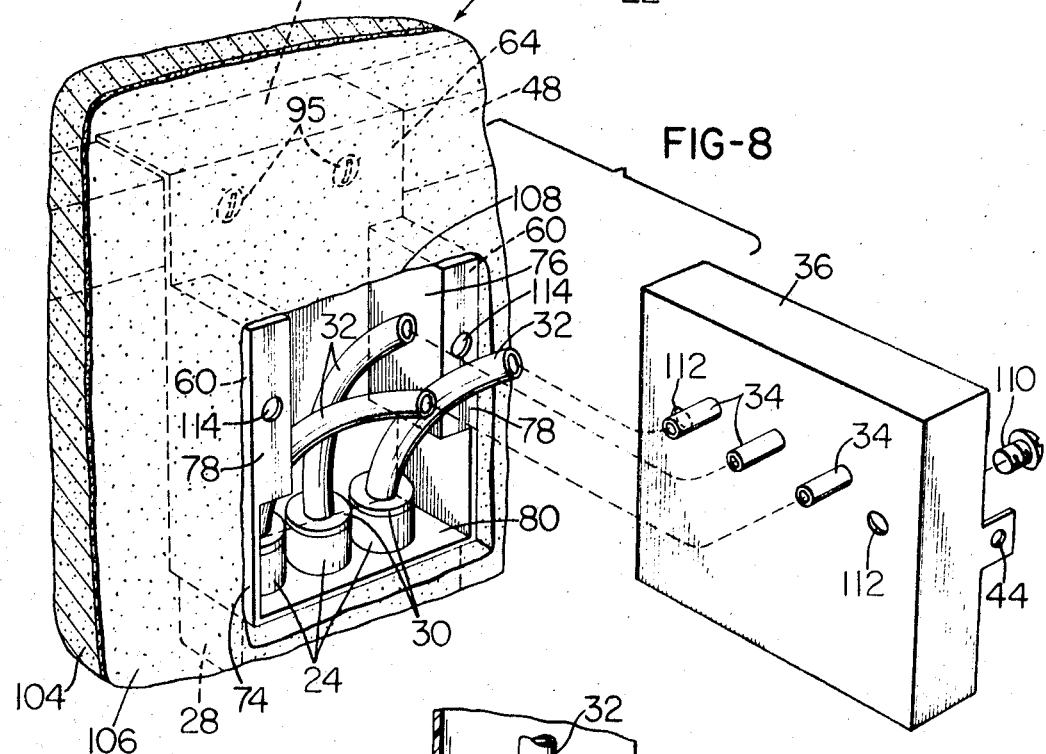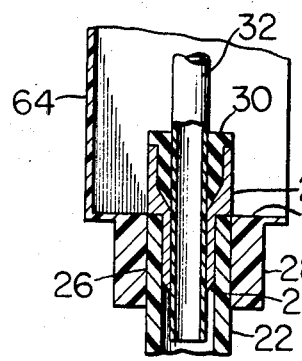

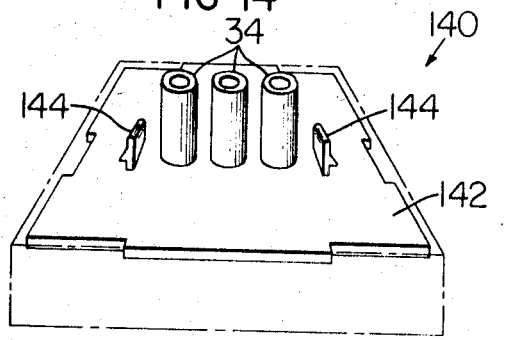
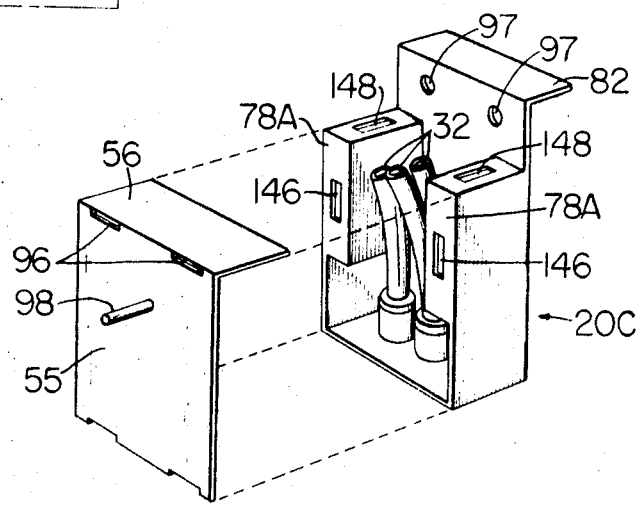
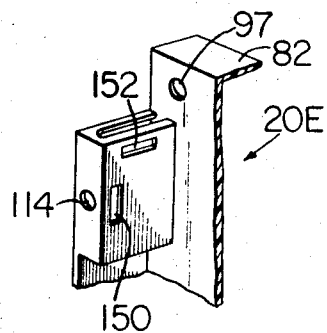
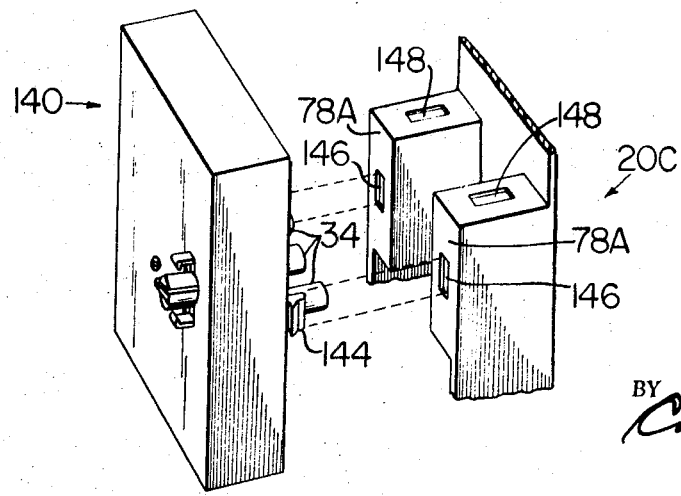

United States Patent Office 3,470,901
Patented Oct. 7, 1969

3,470,901
METHOD AND MEANS FOR CONNECTING FLUID TUBING TO FLUID DEVICES
Larry V. Nisley, Goshen, Ind., assignor to Robertshaw Controls Company, Richmond, Va., a corporation of Delaware
Filed Sept. 22, 1967, Ser. No. 669,929
Int. Cl. F16l 5/02; H01r 13/46
U.S. Cl. 137—360                    24 Claims

ABSTRACT OF THE DISCLOSURE

This application discloses method and means for connecting fluid tubing to fluid devices, such as fluid flow controllers, thermostats and the like. Relatively smaller connective tubing is telescoped into relatively larger main tubing with an adapter fitting in an end of the larger main tubing and a sealing and sliding seal in the adapter fitting and with the smaller connective tubing sliding in past the seal into or out of telescoping relation with the larger main tubing. A molded mounting box construction is mounted on a partition or wall of a building with the end of the larger main tubing sealed and secured to the box construction. The connectible end portion of the smaller tubing is connected to the controller and then the excess connectible tubing is telescoped or stored into the main tubing as the controller is secured to the mounting box.

---

This invention relates to method and means for connecting fluid tubing to fluid devices.

This invention permits faster, cheaper, and easier installation of fluid devices, such as fluid control thermostats and other devices on various wall constructions of buildings, and the like.

A system, according to this invention may include one or more main fluid supply lines or tubes, which may be made of metal or plastic material. Each such main tube may have an adapter fitting placed in the end of such tube. A rubber seal is placed over a connective plastic tubing, and the seal and connective tube are telescoped into the adapter fitting and main supply tube.

In the installation of said system one or more of such main supply tubes will be run to a desired location, on a wall or the like, where the adapter fitting may be inserted into the end of such main supply tube. The seal will then be slipped over the connective tube and then the seal and connective tube will be inserted in the adapter fitting, and the connective tube can be telescoped into the main tube.

However, the control device will first be connected to such end of the main supply tube and the adapter. Then the rubber seal and connective tube will be inserted into the adapter and the excessive connective tubing will be slipped through the seal and is stored in the core of such main supply tube.

In the past a large mounting box was used and all the excess connective tubing was wadded into this box and the control device was attached to the face of the box. This had an inherent danger in that often the excess tubing would be kinked or collapsed, to interfere with the fluid flow. Another alternative was to insert a small spring into the connecting tube to prevent its collapse, which was an expensive and not always successful practice.

Additionally, according to this invention, a molded plastic box may be used into which one or more of such main supply tubes may be connected. Such box may be secured in the wall of the building and the connective tubing may be connected to the control device. Then the connective tubing may be telescoped into the main supply tube or tubes, as previously described.

The molded plastic box may be made so that certain parts of the box may be cut or clipped away to render the box mountable on various parts of walls, such as a plaster wall, a mortar joint in the masonry wall, studding of such wall, and other locations and constructions of such walls, or other partitions of the building.

Many features of this invention are apparent from this description, the accompanying claimed subject matter, and/or the accompanying drawings in which:

FIGURE 1 is a perspective view of one embodiment of a molded plastic box construction which may be mounted on a wall construction with or without the removal of certain parts of the box construction, before installation on or in the wall.

FIGURE 2 is a perspective view of remaining portions of the box of FIGURE 1, after other parts have been cut away, and after the remaining parts have been folded into the shape they will have after installation in a wall construction, such as shown in FIGURE 4.

FIGURE 3 is a perspective view of the structure of FIGURE 2, but from a different viewpoint.

FIGURE 4 is a diagrammatic exploded view of the structure of FIGURES 2 and 3 mounted between studding of a wall prior to the completion of such wall.

FIGURE 5 is an enlarged diagrammatic cross-section of part of FIGURE 4 taken along the line 5—5 of FIGURE 4.

FIGURE 6 is an exploded cross-section of certain parts of FIGURE 5.

FIGURE 7 is a diagrammatic cross-section of the finished wall of FIGURE 4, and before the attachment of a fluid control device.

FIGURE 8 is a diagrammatic perspective view, showing diagrammatically the connection of the connective tubing through the rear portion of a control device, such as a thermostat.

FIGURE 9 is a diagrammatic cross-section of the parts of FIGURE 8 installed in the wall, and with the remaining portion of the control device or thermostat ready to be connected to the installed parts.

FIGURE 10 is a perspective view of the controller device parts of FIGURE 9, ready to be connected together.

FIGURE 11 is a diagrammatic view of parts of the box structure of FIGURE 1 installed in a masonry mortar joint, with parts of the plastic box and part of the masonry joint further removed to receive a part of the control for installation.

FIGURE 12 is a perspective view of the cover and end flap of the plastic box of FIGURE 11, with the end flap, which has been removed in FIGURE 11, still attached to the cover.

FIGURE 13 is a perspective diagrammatic view of the structure of FIGURES 2 and 3 connected in a horizontal position directly to a stud of a wall, and with the cover and end flap omitted to disclose the interior of the remaining parts of the plastic box, and with the main supply tubes and connective tubes installed therein.

FIGURE 14 is a diagrammatic perspective view of another type of thermostat which may be connected to a modified form of box construction of this invention.

FIGURE 15 is a diagrammatic exploded perspective view of a modified form of plastic box with parts cut away, and with connective tubing connected therein in an installation similar to that of FIGURES 4-10, but for use with the thermostat of FIGURE 14.

FIGURE 16 is a diagrammatic perspective exploded view of the thermostat of FIGURE 14 about to be connected to part of FIGURE 15.

FIGURE 17 is a diagrammatic perspective view of a portion of a further modified plastic box, modified to receive either the thermostat of FIGURES 8–10 or the thermostat of FIGURES 14 and 16.

Certain words may be used in this specification and claimed subject matter which indicate direction, relative position, and the like. These words are used for the sake of brevity and clearness. However, it is to be understood that such words are used only in connection with the drawings, and that in actual use, the parts so described may have entirely different direction, relative position, and the like. Samples of such words are "vertical," "horizontal," "upper," "lower," etc.

Referring first mainly to FIGURES 1–6, a molded plastic box, or box construction 20, FIGURE 1, may have parts thereof cut away, if necessary, and the remaining parts may be connected with one or more main supply tube or tubes 22. Such main supply tubes 22 may be made of plastic or metal material. Each end of each said main supply tube or tubes 22 may be inserted into the box construction 20 through holes 26, FIGURES 3 and 5, in the relatively thick tube receiving part or extension 28 of the box 20.

Thereafter a metal or plastic fitting 24, FIGURES 5 and 6, may be placed in the end of each main tube 26. Also, a seal 30, made of rubber or the like, may be slipped over a connective tube 32, FIGURES 1, 5 and 6, and then such tube 32 and seal 30 may be telescoped into the fitting 24 and the excess part of the connective tube 32 may eventually be slipped into and stored in the interior of the respective main tube 22.

The fitting 24 may have a tapered end 25 so that when the fitting 24 is telescoped in the end of the main tube 22, such fitting 24 and main tube are tightly secured in the opening 26 of the plastic box 20.

In the embodiment shown in FIGURES 1–10, three main tubes 22 are shown, which receive respectively three adapter fittings 24, three seals 30, and three connective tubes 32, which eventually will be connected to the three connecting nipples 34 of the thermostat control box 36.

The thermostat box 36 is sometimes shown as an empty box in the drawings. However, such box 36 may actually contain substantially all of the thermostat construction, which is believed not to be necessary to illustrate in the drawings. A thermostat cover member 38 may be placed over or adjacent the thermostat box 36 and may be secured thereto by means of the screws 40, FIGURE 10, which may pass through the holes 42, 44 FIGURES 8, 9 and 10 to complete the installation of the thermostat on the wall, as shown in various degrees of completion in FIGURES 1–10.

However, before the thermostat cover member 38 is secured to the thermostat box 36, the various cutting and mounting procedures shown in FIGURES 1–9 are to be performed.

During the construction of a building, for example, in which vertical studs 46 have been erected, a horizontal cross bar 48 may be secured between two of such studs 46, by brackets 47, when it is desired to locate a thermostat, as shown in FIGURE 4.

For the installation of FIGURES 2–10, a thermoplastic box 20, of FIGURE 1, may be cut or trimmed along the line 50 and its extension toward the viewer, and along the line 52. This is done on each side of the box 20. Also, if desired, the locating pin 54 may be trimmed off, as it is not used in the installation of FIGURES 2–10. The remaining parts of the trimmed box 20A if completely folded, then have the appearance of FIGURES 2 and 3, but during various steps of the installation shown in FIGURES 4–10, such remaining parts do not have the positions and appearance of FIGURES 2 and 3, as will become apparent.

After the plastic box 20 of FIGURE 1 has been trimmed along the lines 50 and 52 as described above, and before the box cover 55 and end flap 56 have been folded to the positions of FIGURES 2 and 3, the U-shaped metal fastener inserts 58 are inserted in the fastening enclosures 60 through openings 62 in the floor 64 of the box 20A. Then the end walls 66 of the fastener inserts 58 are secured to the enclosures 60 at the slots 68 by the screws 70 the heads of which engage outer edges of the slots 68. Such screws are received in the threaded openings 72 in the end walls 66.

The enlosures 60 have outer side walls 74, inner side walls 76, top walls 78 and bottom openings 62.

The plastic box also has a back wall 80, and front flange 82. The side flanges 84 and back flanges 86 are the parts that have been trimmed off along lines 50 and 52. If desired the inside pins 88 may be inserted into the slots 68 when the cover 55 is folded down, in FIGURES 2 and 3 and the end flaps 56 are also bent in.

The cover 55 may be hingedly connected to the back wall 88 at the bend 90, and slots 92 may be made in the cover 55 adjacent the bend 90 to guide in severing the cover 55 from the back wall 88 when desired. The cover may be hingedly connected to the end flap 56 at the bend 94, and the cover may have slots 96 to guide in severing the flap 56 from the cover 55 when desired.

Before or after mounting the trimmed box 20A on the horizontal cross bar 48 in FIGURE 4, the main tubes 22, and the adapter fittings 24 may be inserted and tightly wedged in the openings 26 of the tube receiving part 28. Also, the seals 30 may be inserted in the fittings 24 and the connecting tubes 32 may be partly telescoped into the main tubes 22 with sufficient excess length remaining above the seals 30 so that later such connecting tubes may be connected to the connecting nipples of the thermostat box as shown in FIGURE 8.

The trimmed box 20A may be mounted and secured to the cross bar 48 by screws 95, which pass through screw holes 97 in the floor 64 of the box 20 and 20A.

After the above connections have been made, the cover 55 may be folded against the top walls 78 and the end flap 56 may be folded against the outer edges of the slots 68 with the inside locking pins in the slots 68. If desired, a small amount of releasable compound may be placed on the top walls 78 and outer edges of the slots 68 to hold the cover 55 and end flap 56 in place until the wall is finished. The locating pin 98, which is part of the plastic box 20, remains to extend out of the finished wall, as shown in FIGURE 7.

After the parts are secured in place in FIGURE 4, the plaster wall 100 may be finished as shown in FIGURE 7. For example, wire mesh 102 may be secured on the studs 46, and plaster coat 104 and finish coat 106 may be applied with the locating pin remaining outside so that a wall thermostat may later be connected and secured as shown in FIGURES 8–10.

In FIG. 8, the wire mesh 102, and plaster and finish coats 104 and 106 have been broken away to form a thermostat receiving opening 108 where the thermostat control box 36 may be secured. The cover 55 may be cut at the bends 90 and 94 and then the cover 55 may be removed for access to the interior of the box 20. The connectible tubes 32 may then be connected to the nipples 34 of the thermostat box 36, and, if necessary, the excess portions of the tubes 32 may be further telescoped into the main tubes 22 through the seals 30. Then the attaching screws 110 may be passed loosely through openings 112 of the thermostat box 36, loosely through openings 114 in top walls 78, and threadedly into openings 116 in fastener inserts 58 in the fastener enclosures 60. This firmly secures the main body or box 36 of the thermostat on the wall 100 and connects the control parts of the thermostat, not shown, with the fluid control system which includes one or more main supply tubes 22 to control a heating and/or cooling system for the room or building.

Thereafter, the thermostat cover member 38, FIGURES 9 and 10, may be secured to the thermostat box 36 by means of screws 40 which pass loosely through opening 42 and threadedly into opening 44.

Such thermostat box 36 and thermostat cover 38 form a finished thermostatic control, with a plate or disc 118 as part of the adjustment means of the thermostat to obtain the desired control of the heating and/or cooling system or the like. The thermostat box 36 and cover 38 are indicative of any well known controllers now on the market.

The trimmed box 20A may also be horizontally secured to the vertical stud 46A of FIGURE 13 in an obvious manner in view of the disclosure of FIGURES 1–10. A lath and plaster, or plasterboard wall may be secured to the stud 46A in an obvious manner, and such wall may be opened to receive the thermostat box 36 in an obvious manner, in view of the disclosure of FIGURES 1–10.

FIGURES 11 and 12 show a construction in which this invention may be applied to a mortar joint in a masonry wall 119. The masonry wall may include the mortar joints 120, 121, etc. between the bricks or concrete blocks 122, 124, etc.

The plastic box 20 of FIGURE 1 may be trimmed into the condition shown at 20B, FIGURE 11, with the cover 55 and end flap 56 and locating pin 54 still connected to such trimmed box 20B. The front end of floor 64 has been cut and removed just behind the openings 97, FIGURE 1, but the side flanges 84 and back flanges 86 of FIGURE 1 may remain and need not be cut and removed. The outer side walls 74, top walls 78, thick tube receiving part 28, etc., are shown in dotted lines where they will be covered by the mortar of the joint 120.

After the tubes 22, not shown, fittings 24, seals 30 and connectible tubes 32 have been installed in the plastic box 20B, such box 20B, with the cover 55, end flap 56 and locating pin 54 may be laid on the brick or cement block 124 before the mortar joint 120 has been formed and before the brick 122 has been laid on the mortar of joint 120. If desired the openings 126, FIGURE 1, in side flanges 84 may be used to receive expansion bolts 128, FIGURE 11, which have been placed in drilled openings in the brick or concrete block 124. This holds the plastic box 20B securely in place while the mortar joint 120 and brick 122 are laid on brick 124. The main tubes 22, not shown, extend backward through the mortar joint 120 to the other side of the wall, or the like.

The mortar joint 120 may be completed in front of the end flap 56 of cover 55, of FIGURE 12 with the tubes 32 folded in behind the flap 56, and with the locating pin 54 extending out of the mortar joint.

Later the mortar joint 120 may be cut away from in front of the flap 56 to form the opening 130 in the mortar joint for the reception of the thermostat box 36.

The flap 56 may be cut or torn away from the front of the plastic box 20B to receive the thermostat box 36.

The metal fastener inserts 58 have been previously inserted in the fastener enclosures 60 through the openings 62 in the floor 64 of the box 20A and have been fastened by screws 132 which pass loosely through openings 114 (FIGURE 1) in top walls 78 and are threaded in openings 116, FIGURE 1, of the fastener inserts 58.

The screws, similar to screws 110 of FIGURES 8 and 9, pass through openings 112 in thermostat box 36, through grooves 68 and into threaded openings 72 in fastener inserts 58 to secure the thermostat box 36 in front of the masonry wall.

The thermostat cover 38, similar to that of FIGURE 10 may be secured to the thermstat box 36 of FIGURE 11 in a similar manner.

A thermostat 140, FIGURES 14 and 16, with an attached plastic back plate 142 and with plastic flexible hook members 144 on such back plate 142 may be attached to the trimmed plastic box 20C which is substantially the same as trimmed plastic box 20A of FIGURES 2–10.

The thermstat back plate 142 has connecting nipples 34 to be connected to connectible tubes 32, as in FIG-URES 2–13. However, the top walls 78A of box 20C have slots 146 which will receive and lock the hook members 144 when the thermostat 140 is pushed toward the box 20C, as indicated in FIGURE 16.

Suitable tools, not shown, may extend around the thermostat to push the hooks 114 inwardly for detachment of the thermostat 140.

Slots 148 may be provided in the original modified plastic box which may be similar to plastic box 20 FIGURE 1, with slots 146 and 148 instead of holes 114 and slots 68. Such modified plastic box may be trimmed for use similar to the mortar joint use of FIGURES 11 and 12.

If desired, a box 20E, FIGURE 17, may be provided with openings 97 and 114 as well as all the other parts of the box 20 of FIGURE 1 for attachment of thermostat boxes similar to those shown in FIGURES 1–13. However, slots 150 may be provided in the inner wall 76 to receive the plastic hook members 114 of thermostats like thermostat 140. Also, slots 152 may be provided to receive thermostats 140 in a mortar joint, similarly to the use in FIGURES 11 and 12.

It is thus to be seen that a method and construction or means have been provided in which a partition means 100 or 119, etc., of a building or the like, such as floors, ceilings or the wall structures 100, or 119, etc. herein disclosed, may have fluid flow controller means, to be more fully identified, mounted thereon, according to this invention. For example, fluid flow tubing means 22 and 32 may be connected to such fluid controller means. Such controller means may include any of the mounting boxes 20A, 20B, 20C, 20E, etc. together with a main controller member or box 36 and the controller cover member 38.

The fluid flow tubing means may include main tubing means 22 and connectible tubing means 32 with an excess telescoping end portion of the connectible tubing means 32 telescoped and stored slidingly and sealingly in a larger main tubing end portion of the main tubing means 22. Connectible end portion means extends out of the main tubing means 22 to be connected to the fluid controller means, for example, in the manner shown in FIGURE 8.

The fluid flow controller means may include the mounting box construction 20A, FIGURES 2, 3 and 4, 20B, FIGURE 11, 20C, FIGURES 15 and 16, or 20E, FIGURE 17. The tubing means 22 and 32 may extend into the mounting box construction 20A, etc. in a manner so that the main tubing end of main tubing 22 may be secured at one end to the mounting box 20A, etc. with the telescoping end portion of the connectible tube 32 extending into the main tube 22. The slidable and connectible end portion of the tubing 32 may then extend into the mounting box 20A, etc., and may be connected to the fluid flow controller means which may be the main controller member or box 36.

The various mounting box constructions shown in the various figures, may be made from the plastic mounting box blank 20, of FIGURE 1, the parts of which have been previously described. Various parts of the blank 20 of FIGURE 1 may be trimmed off to produce the mounting boxes 20A, 20B, etc. For example, mounting box 20A of FIGURES 2, 3 and 4 is made by trimming off the side flanges 84 and the back flanges 86, so that the trimmed mounting box has a floor 64, two outer side walls 74, a back wall 80, these walls extending upwardly from the floor 64, in FIGURE 1. A cover 55 is hinged to the back wall 80 by hinged bend 90. Such cover has a hinged flap 56 and two fastener enclosures formed by the two outer side walls 74 and by two inner side walls 76, two top walls 78, and two front walls which have grooves 68. These walls extend between the two outer side walls 74 of the main blank. The back wall 80 has openings which receive the adapter fittings 24, as shown in FIGURE 1.

Metal inserts 58 are inserted in the fastening enclosures shown in FIGURE 1, and screws 110 may pass through openings such as 112 and 114, for example in FIGURES 8 and 9 to engage the openings 116 of the metal clips 58 in FIGURES 8 and 9. However, in the masonry wall construction of FIGURE 11, such screws 110 enter the openings 72 of the metal clips. Alternatively, flexible hooks 114 of FIGURES 14 and 16 are provided in the fluid controller 140, and such hooks 144 may enter the openings 146 or 148 of the top walls 78A of the mounting box 20C of FIGURE 15 or the openings 150 and 152 of the mounting box 20E. In FIGURE 17 the openings 114 and 68 may accept the fluid flow controller 36 substantially the same as in FIGURE 8.

The controller main member 36, of FIGURES 1–13, is shown as a box, and may contain substantially all of the controller construction, and may be secured to the mounting blocks 20A, 20B, etc.

Other features have been identified in previous descriptions, which show the telescoping features of the tubing 22, 32, the basic molded plastic blank 20 of FIGURE 1, and the mounting boxes 20A, 20B, etc. which may be trimmed from such blank 20 and which are shown in FIGURES 2, 3, etc. Such tubing 22, 32 may easily be connected to the mounting boxes 20A, 20B, etc. These boxes 20A, 20E, etc. may be mounted on various building partitions, such as the walls illustrated in the drawings. Then the main controller members 36 may be connected to the tubing 32 and to the mounted box 20A, etc. Then the controller cover 38 may be attached to the main controller member 36.

A new and useful method and means for connecting fluid tubing, such as tubing 22 and 32 to fluid devices, such as the mounting boxes 20A, 20B, etc., the main controller member 36, and the controller cover 38 have been provided for quick and easy installation on partitions, buildings, and the like.

What is claimed is:

1. A construction comprising, partition means of a building or the like, fluid flow controller means mounted on said partition means, fluid flow tubing means connected to said fluid flow controller means, said fluid flow tubing means including fluid flow main tubing means and connectible tubing means with a telescoping end portion means of said connectible tubing means and a main tubing end portion means of said main tubing means forming a storing, sliding and sealing telescoping joint, and with a connectible tubing end portion means extending out of said main tubing end portion means and being connected to said fluid flow controller means.

2. A construction according to claim 1 in which said fluid flow controller means includes a mounting box construction means mounted on said partition means, and to which said main tubing end portion means is connected with said connectible tubing end portion means extending into said mounting box construction means, and in which said fluid flow controller means also includes a fluid flow controller main member means to which said connectible tubing end portion means is connected, and which controller main member means is mounted on said mounting box construction.

3. A construction according to claim 2 in which said mounting box construction means is made from a plastic mounting box blank having a floor, two outer side walls and a back wall extending upwardly from said floor, a cover hinged to said back wall, an end flap hinged to said cover, two fastener enclosure means formed by said two outer side walls and by two inner side walls extending from said floor and two top walls extending between said two outer side walls and said two inner side walls, said back wall having tubing receiving opening means to receive said fluid flow tubing means.

4. A construction according to claim 3 with metal fastener inserts in said fastener enclosure means which fastener inserts have fastener receiving openings receiving fastening members extending from said fluid controller main member means and fastening said controller main member means to said mounting box construction means.

5. A construction according to claim 3 in which said floor has a front flange, two side flanges and two back flanges.

6. A construction according to claim 3 in which said back wall has a thick tube receiving extension means having tubing receiving opening means to receive said fluid flow tubing means.

7. A construction according to claim 3 in which said two fastener enclosure means also have two respective front walls connected respectively to said two inner and outer side walls.

8. A combination according to claim 7 in which a respective wall of each of said two fastener enclosure means has a fastener receiving opening means receiving a fastener from said controller main member means.

9. A combination according to claim 8 in which each of said fastener receiving opening means receives a respective screw fastener from said controller main member means.

10. A combination according to claim 8 in which each of said fastener receiving opening means receives a respective hook fastener from said controller main member means.

11. A combination according to claim 7 in which each of said two respective fastener enclosure means has means receiving fastener means from said controller main member means.

12. A combination according ot claim 1 in which an adapter fitting means is partly inserted in said main tubing end portion means, a slidable seal means surrounds said connectible tubing end portion means, with said slidable seal means being in said adapter fitting means, and said connectible tubing means being slidable past said seal means into and out of said main tubing end portion means.

13. A combination according to claim 2 in which said mounting box construction means includes a locating means to indicate the location of said mounting box construction on the finished partition means.

14. A construction comprising partition means of a building and the like, fluid flow controller means mounted on said partition means, said fluid flow controller means including a plastic mounting box construction means mounted on said partition means and having a floor wall, two outer side walls and a back wall extending upwardly from said floor, and fluid flow tubing means with a fluid flow main tubing means connected to one of said walls and with a flexible connectible tubing means with one connectible tubing end longitudinally slidably and sealingly held in said main tubing means and with another connectible tubing end connected to a fluid flow controller main member means which is secured to said mounting box construction means.

15. A construction according to claim 14 in which a removable cover is integrally hinged to one of said walls.

16. A construction according to claim 15 in which said cover has a hinge bend integrally connected to one of said walls.

17. A construction according to claim 14 in which said fluid flow controller means has said fluid flow controller main member means secured to fastening enclosure means in said mounting box means.

18. A method of mounting fluid flow controller means on a partition means and connecting said controller means to fluid tubing means which comprises, inserting and storing an excess telescoping end portion means of a flexible connectible tubing means longitudinally slidingly and sealingly into a larger main tubing end portion of a main tubing means and connecting another end portion means of said flexible connectible tubing means which extends out of said main tubing end portion means to a fluid flow control member of said fluid flow controller means.

19. A method according to claim 18 which includes mounting a mounting box construction on said partition means and connecting said main tubing end portion means to said mounting box construction with said another end portion means extending into said mounting box construction, and connecting said another end portion means of said connectible tubing means to said fluid control member, and mounting said control member on said mounting box construction.

20. A method according to claim 19 which includes making said mounting box construction from a plastic mounting box blank having a floor wall, two outer side walls and a back wall extending upwardly from said floor wall, with a cover hinged to said back wall, with an end flap hinged to said cover, with two fastener enclosures formed by said two outer side walls and by two inner side walls extending from said floor wall and two top walls extending between said two outer side walls and said two inner side walls, said back wall having tubing receiving opening means, connecting and securing said main tubing end portion to said tubing receiving opening means and connecting said another end portion means to said control member means.

21. A construction comprising, a partition of a building and the like, a mounting box construction mounted on said partition, a relatively large fluid flow main tube adjacent said partition and having a main tube end connected to said box construction, a relatively small flexible fluid flow connectible tube with a connectible tube telescoping end longitudinally slidably and sealingly held telescoped and stored in said main tube end, said connectible tube having another connectible tube end extending into said box construction, and a fluid flow control member mounted on said mounting box construction, said another connectible tube end being connected to said control member.

22. A construction according to claim 21 which has a plurality of main tubes similar to said first-named main tube similarly connected to said box construction, and a plurality of connectible tubes similar to said first-named connectible tube and similarly connected to respective said main tubes and to said control member.

23. A construction according to claim 21 in which said mounting box construction is a plastic box construction.

24. A construction according to claim 23 in which said plastic box construction has a removable cover integrally hinged to said box construction.

References Cited

UNITED STATES PATENTS

| | | | |
|---|---|---|---|
| 1,585,084 | 5/1926 | Cunningham | 137—361 |
| 1,987,100 | 1/1935 | Dick | 285—158 XR |
| 2,952,271 | 9/1960 | Dick et al. | 137—360 |
| 3,159,318 | 12/1964 | Green | 29—451 XR |
| 3,298,641 | 1/1967 | Puerner | 174—48 XR |
| 3,340,349 | 9/1967 | Zerwes | 174—53 |

HENRY T. KLINKSIEK, Primary Examiner

U.S. Cl. X.R.

29—450; 174—48, 53; 236—86; 285—158